May 3, 1966 R. SUHRMANN 3,249,693
CIRCUIT ARRANGEMENT INCLUDING A DIRECT-CURRENT COUPLED TRANSISTOR AMPLIFIER FOR TELEVISION SIGNALS
Filed Aug. 7, 1962
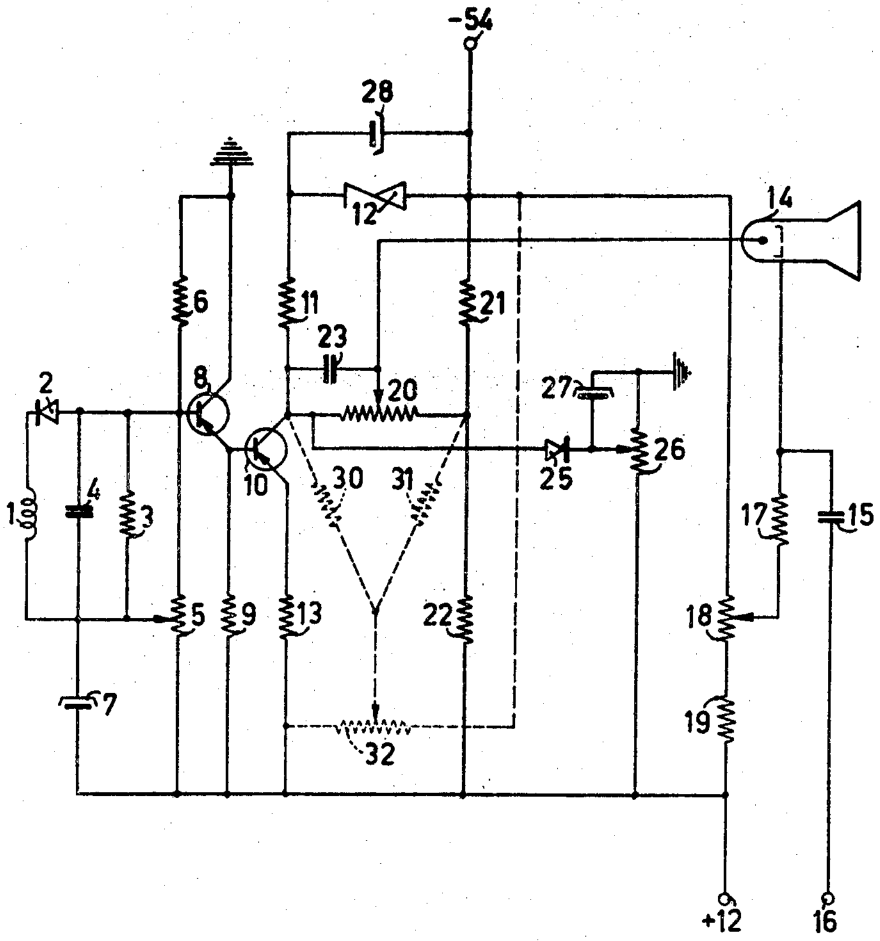
INVENTOR
ROBERT SUHRMANN
BY Frank R. Jifari
AGENT United States Patent Office 3,249,693

Patented May 3, 1966

3,249,693

CIRCUIT ARRANGEMENT INCLUDING A DIRECT-CURRENT COUPLED TRANSISTOR AMPLIFIER FOR TELEVISION SIGNALS

Robert Suhrmann, Hamburg-Rahlstedt, Germany, assignor to North American Philips Company, Inc., New York, N.Y., a corporation of Delaware Filed Aug. 7, 1962, Ser. No. 215,333
Claims priority, application Germany, Sept. 14, 1961, P 27,828
11 Claims. (Cl. 178—7.5)

This invention relates to a circuit arrangement including a direct-current coupled transistor amplifier for television signals, the collector of the transistor being connected to the cathode of a display tube, while a variation of the image brightness is effected by variation of the bias of the display tube.

For driving a display tube a comparatively large voltage drive of, for example, from 25 v. to 30 v. difference between black level and white level is required. Although transistors are capable of delivering comparatively heavy currents at low voltages, such a large output signal voltage is not readily obtained with transistors. Consequently, the transistor has to be driven as completely as possible within its permissible range between cut-off and the bottomed condition. In view of the gradation of the picture to be displayed the collector of a PNP transistor is preferably connected to the cathode of a display tube. This provides better driving of the display tube current because the steepness of the screen grid is also utilized. The maximum signal for the peak white level is obtained when the cathode of the display tube is driven negative as far as possible. Because the collector of the transistor is connected to the negative terminal of the supply source, this corresponds to the value at which the collector current is a minimum and the collector voltage approaches the supply voltage.

To control the background brightness of the display tube the bias for the intensity control electrode, for example the Wehnelt cylinder, has to be varied within a certain range, for example, by from 5 to 15 v. As is well known, when the voltage between the cathode and the grid of the display tube becomes substantially zero, grid current commences to flow which may produce appreciable distortion of the signal. This is particularly critical because the signal components for peak white may have a considerable amplitude. Hence the background brightness has to be controlled by means of a bias variation to such a value that no grid current can flow. In other words, the bias voltage must vary from a value negative with respect to the cathode potential for white signals to more negative values. Since, as has been mentioned hereinbefore, the peak white level of the cathode voltage substantially corresponds to the (negative) battery voltage, such an arrangement would require a voltage which with respect to the said battery potential would be even more negative. Generally such a voltage is not available or can only be produced with large additional expenditure.

Alternatively the operating potential of the video amplifying transistor may be made more positive by the desired voltage by connecting in series with the load resistor a resistor the voltage drop across which may be stabilized by an additional parallel current and which may be shunted for alternating current by a capacitor.

As is well known, the television signal also includes a so-called direct-current component for which capacitive shunting of a resistor has substantially no effect. Hence there is a difference in the amplification of the direct-current component and of the alternating current components from the lowest to the highest values. As a result in passing from bright scenes to dark scenes and conversely a black-level error occurs which may be positive or negative. An amplifier has a positive black-level error when the amplification of the direct-current component is less than that of the lowest alternating current components.

Such an error is found, for example, in a direct-current coupled amplifier including a transistor in common emitter arrangement in the emitter circuit of which is connected a resistor of appreciable value which is shunted by a capacitor. This provides negative feedback for the direct-current component but not for the alternating-current components. When passing from a predominantly white picture to a predominantly black picture, the black level is shifted towards white. A negative black level error occurs with reversed amplification conditions and reveals iteslf by a shift towards black when passing from a predominantly white picture content to a predominantly black picture. A negative black level error occurs especially when part of the collector output resistor is shunted by a capacitor. A black level error in the output signal may be compensated by the provision of circuit elements for producing a positive black level error and circuit elements for producing a negative black level error and having the same frequency characteristic curve (time constant).

By connecting in the above mentioned manner a capacitively shunted resistor which produces a decrease of the supply voltage in the collector circuit of the video amplifier not only the desired shift of the operating voltage—for the alternating-current component—but also a negative black level error would be produced. This error would have to be compensated by additional means, for example, by connecting a larger resistor in the emitter circuit, however, this would involve a further decrease of the effectively available supply voltage for the transistor amplifier.

In a circuit arrangement of the kind described in the preamble, the above disadvantages may be obviated and the desired variation of the background brightness is obtainable without affecting the quality of the transmission, particularly without an undesirable black level error, if in accordance with one aspect of the invention a voltage stabilizing element is connected between the negative terminal of the supply source and the collector load resistor of the transistor. A potential difference substantially corresponding to the voltage range required for the brightness variation is produced across this voltage stabilizing element, and the brightness control electrode (Wehnelt cylinder) of the display tube is connected to the sliding contact of a potentiometer connected to the negative terminal of the supply source.

The voltage stabilizing element preferably is a voltage dependent resistor sintered from silicon carbide and commercially available under the name of "VDR-resistor." The voltage across such a resistor is slightly dependent upon the current flowing through it but this effect may be reduced by an auxiliary current supplied through a resistor connected to the positive terminal. However, generally a small negative black level error is desirable because it is capable of compensating for the difference in sensitivity of the eye in dark and slight adaptation. When passing from a dark scene to a bright scene the abrupt change is slightly reduced and subsequently the picture becomes slightly brighter as the sensitivity of the eye decreases due to increasing adaptation. It must be ensured that the time constant of the black level variation substantially corresponds to the variation of the sensitivity of the eye. Hence it may be of advantage to connect a large capacitor in parallel with the voltage stabilizing element. It may also be of advantage to connect a resistor in series or in parallel with the stabilizing element in order to achieve a desired black level error.

When the voltage stabilizing element is an element having a negative temperature coefficient of resistance, for example, a NTC resistor having a suitable small time constant, the parallel capacitor may be omitted.

In order that the invention may readily be carried into effect, an embodiment thereof will now be described, by way of example, with reference to the accompanying diagrammatic drawing. The single figure of the drawing is a circuit diagram of the direct-current coupled video stages of a television receiver and the associated cathode-ray display tube.

The high-frequency or intermediate-frequency oscillations modulated by the picture signals are applied by a coupling coil 1 to the cathode of a diode 2. The anode of the diode is connected to the other end of the coil 1 through the parallel combination of a load resistor 3 of, for example, 2.7K ohms and a smoothing capacitor 4 of, for example, a few picofarads. The latter end of the coil is also connected to the sliding contact of a potentiometer 5 of, for example, 500 ohms. One end of the potentiometer is connected to the positive terminal of the supply source having a potential of, for example, +12 volts with respect to ground, and the other end is connected to ground through a series resistor 6 of, for example, 2K ohms. The sliding contact of the potentiometer is also connected, through a capacitor 7 of, for example, 50 microfarads to the supply source.

The anode of the diode is also connected to the base of a PNP transistor 8. The collector of transistor 8 is connected to ground and the emitter is connected to +12 volts through a load resistor 9 of, for example, 1.2K ohms. The emitter of the transistor 8 is also connected to the base of a PNP final transistor 10. The collector of transistor 10 is connected through a load resistor 11 of, for example, 4.7K ohms to the negative terminal of the supply source, for example, −54 volts. A voltage dependent resistor (VDR) 12 across which in operation a substantially constant voltage drop of, for example, 15 volts is produced is connected in series with the resistor 11. The emitter of the transistor 10 is connected through a resistor 13 of, for example, 82 ohms to the positive terminal of the supply source.

In the circuit arrangement described so far the demodulated video signal including negative going synchronizing pulses is developed across the resistor 3. With respect to the circuit arrangement under consideration this means that a negatively modulated television signal is received. If, however, a positively modulated signal is received, the same result may be obtained by connecting the load resistor 9 in the collector circuit of the transistor 8 and connecting the base of the transistor 10 to the collector of the transistor 8. The transistor 8 operates solely as an impedance converter so that at its emitter the video signal appears with substantially the same amplitude and polarity as at its base. The operating point of the transistor 8 may be fixed by adjusting the sliding contact of the potentiometer 5. The signal taken from the emitter of the transistor 8 is applied to the base of the transistor 10. Negative feedback having a linearizing action is provided by employing an emitter resistor 13 for the transistor 8. An amplified video signal having an amplitude of approximately from 25 to 30 volts between black level and white level is obtained at the collector of the transistor 10.

This signal is supplied to the cathode of a display tube 14 which is of a known type, so that its further electrodes, deflection devices, and so on, will not be described. The Wehnelt cylinder of the display tube 14 to which flyback pulses may be applied from a terminal 16 through a capacitor 15 (for suppressing beam current during flyback time) is connected through a series resistor 17 of, for example, 470K ohms to the sliding contact of a brightness potentiometer 18 of, for example, 27K ohms. One end of potentiometer 8 is connected to the negative terminal of −54 volts of the supply source and the other end is connected through a series resistor 19 of, for example, 100K ohms to the positive terminal of the supply source or to ground.

When there is a direct current connection between the collector of the transistor 10 and the cathode of the display tube 14 is directly connected to the collector of transistor 10 (which is the case when the arm of potentiometer 20 is at the full left position), a potential (with respect to ground) of −39 volts is set up at this cathode in the case of peak white. With the aid of the sliding contact of the potentiometer 18 the potential of the Wehnelt cylinder is adjustable. With the value of 27K ohms for the potentiometer 18 and of 100K ohms for the resistor 19, the voltage drop across potentiometer 18 is about 14 v. When the sliding contact on potentiometer 18 is moved to the junction with resistor 19, the Wehnelt cylinder voltage is still −40 v., so that the Wehnelt cylinder remains negative by about 1 v. with respect to the cathode of display tube 14 even under extreme conditions when the cathode voltage becomes −39 v. for peak white. Consequently, no grid current can flow. This provides maximum drive for the display tube 14. By moving the sliding contact of the potentiometer 18 towards more negative values the background brightness of the tube 14 may be reduced in the desired degree, the maximum negative value of the Wehnelt cylinder with respect to the cathode is determined by the voltage drop across the element 12.

It will be appreciated that the circuit for supplying the voltage for the automatic gain control, not shown, for the entire television receiver ensures that the black level of the signal demodulated by the diode 2 is maintained substantially constant. For this purpose the information for the automatic gain control may be taken in the form of direct current from the collector or emitter circuit of the transistor 10. It may be stated that the problem of holding the Wehnelt cylinder of tube 14 negative with respect to the cathode under all circumstances, does not depend upon the manner by which the contrast is controlled. Thus, if the contrast is controlled by means of the automatic gain control circuit, the cathode of tube 14 may be directly connected to the collector electrode of transistor 10.

In order to enable the contrast to be varied, that is to say, the amplitude of the video signal at the display tube 14 the cathode of the tube 14 is not directly connected to the collector of the transistor 10, but is connected to the arm of a potentiometer 20 for contrast control. Potentiometer 20 is connected between the collector of the transistor 10 and the junction of a resistor 21 of, for example, 30K ohms and a resistor 22 of, for example 20K ohms connected in series between the two terminals of the supply source. The exact values of the resistors 21 and 22, which may be constituted by an adjustable potentiometer of, for example, 50K ohms are determined by the fact that the voltage across the potentiometer 20 must be zero at black level. At this value there is produced at the collector of the transistor 10 an (internal direct-current) resistance the ratio between which and the resistor 22 must be equal to the ratio between the resistor 11 and the resistor 21. In this case the shifting of the sliding contact of the potentiometer 20 produces no variation of the black level so that this level is maintained constant independently of the contrast adjustment. However, when the sliding contact of the potentiometer 20 of, for example, 25K ohms is shifted, the contrast is appreciably varied. In the circuit arrangement shown, this variation is by a factor of approximately 3. It should be noted that even when the sliding contact of the poteniometer 20 is connected to the junction of the resistors 21 and 22 a video signal is produced because the effective internal resistance of the voltage divider 21, 22 is of the same order of magnitude as the resistance value of the potentiometer 20.

Under certain circumstances it may be of advantage to replace the potentiometer 20 by a series combination of a photosensitive or light dependent resistor (LDR) and an ohmic resistor. In this event the free end of the photosensitive resistor is preferably connected to the collector of the transistor 10 and the free end of the ohmic resistor is preferably connected to the junction of the resistors 21 and 22. The cathode is in this case connected to the junction of the photosensitive resistor and the ohmic resistor.

The resistance value of the photosensitive resistor may be varied by irradiation with light from an additional source of light, the intensity of light being controlled by a potentiometer provided at the front of the receiver.

The circuit arrangement shown has a limitation in that the potentiometer 20 is mounted either at the front of the receiver or near the cathode of the display tube 14 which usually is disposed at the back of the receiver. In the first case the long leads connecting the cathode of the tube 14 and the collector of the transistor 10 to the potentiometer 20 provide difficulty, for they are traversed by video-frequency currents of from 0 to 5 mc./s. and hence may give rise to instability of the video amplifier and severe distortion of the video signal. In the second case operation of the potentiometer 20 provides difficulty because it must be effected from the front of the receiver.

These disadvantages are avoided when a photosensitive resistor is used. In this event the leads to the cathode of the display tube 14 and to the collector of the transistor 10 may be short as possible and the potentiometer for controlling the intensity of the additional source of light may be mounted at the front side of the receiver. If this additional source of light is fed, for example, with direct current, the long leads connecting the potentiometer at the front with the light source do not provide difficulty.

To improve the transmission of the high-frequency video signals a capacitor 23 of, for example, 4 picofarads is connected in known manner between the collector of the transistor 10 and the sliding contact of the potentiometer 20.

The synchronizing pulses still present in the video signal taken from the transistor 10 are not used for the brightness modulation of the display tube 14 because the required blanking of the tube 14 may be effected by the negative pulses taken from the terminal 16. To achieve optimum drive of the transistor 10 and to avoid excessive decrease of the collector voltage it may consequently be advantageous to connect the collector of the transistor 10 through a diode 25 to a point of fixed potential in a manner such that the synchronizing pulses are entirely or at least partly suppressed in the collector voltage. Such a point of fixed potential, which may correspond to black level, is obtained by employing a potentiometer 26 connected between ground and the positive terminal of the supply source. The sliding contact of potentiometer 26 is connected to the cathode of the diode 25. The sliding contact is also connected to ground by way of a capacitor 27 of, for example, 50 microfarads. Such a limiting circuit may be used independently of the above described arrangement for adjusting the background brightness.

To avoid a black level error or to achieve a black level error of particular magnitude it may be of advantage to connect ohmic resistors, which may be adjustable, in series and/or in parallel with the VDR resistor 12. A compensating capacitor 28 of, for example, 25 microfarads may be connected, in parallel with the VDR resistor 12 (and, as the case may be, with a series resistor), preferably to the positive terminal of the supply source.

Obviously a Zener diode may be substituted for the VDR resistor 12. The stabilizing effect of a Zener diode is more satisfactory than that of a VDR resistor and the choice between a VDR resistor or a Zener diode may be decided by the magnitude of the permissible black level error.

The insertion of the stabilizing element 12 reduces the supply voltage available for the transistor 10 so that a more negative battery voltage may have to be used to enable the required control voltage to be obtained. This may be avoided if the desired shift of the grid voltage of the display tube 14 is obtained by shifting the cathode to a positive value, whereby a positive voltage is supplied from the positive terminal of the supply source to the collector circuit of the transistor 10. This may be effected by connecting the collector through a variable resistor to the positive terminal of the supply source. Since the desired adjustment of the background brightness generally requires a shift of only a few volts, this resistor may have a comparatively high value for a positive potential so that a current is supplied which is largely independent of the modulation and the output impedance of the transistor 10 is not appreciably varied.

This arrangement is not desirable when the contrast potentiometer 20 is used, because in that case the adjustment of the black level will also be varied when the contrast is varied. This may be avoided by connecting the ends of the contrast potentiometer 20 through resistors 30 and 31 respectively to the sliding contact of a brightness potentiometer 32 connected in parallel with the supply source. The resistors 30 and 31 are proportioned so that the voltage across the contrast potentiometer 20 is zero at black level. The control grid of the display tube 14 may then be connected to a fixed voltage divider or, as the case may be, to the negative terminal of the supply source.

The above condition is satisfied if the ratio between the resistors 30 and 31 is approximately equal to the ratio between the resistors connected between the respective end of the contrast potentiometer 20 and the positive terminal of the supply source at black level, the latter resistors being constituted by the transistor 10 and the resistor 22. Hence one bridge circuit is comprised of resistors 11, 21, 13, 22 and the resistance value of transistor 10 at black level, ensuring that no voltage drop occurs at black level across potentiometer 20. Another bridge circuit is comprised of resistors 30, 31, 13, 22 and the resistance value of transistor 10 at black level, also ensuring that no voltage drop occurs across potentiometer 20 at black level independent of the setting of the sliding contact on potentiometer 32. However, by displacement of the sliding contact on the potentiometer 32, the voltage at the collector electrode of transistor 10 is varied and, because no voltage drop occurs across potentiometer 20 at black level, the voltage at the junction of resistors 22 and 21 varies to the same extent. Thus the potential at the cathode of the display tube 14 is shifted independently of the picture signal and independently of the adjustment of the contrast potentiometer 20 so that the desired adjustment of the background brilliance is obtainable. This circuit arrangement has the particular advantage that with maximum brightness adjustment of the display tube substantially the entire battery voltage is available to the transistor 10 and the collector supply voltage of the transistor 10 is only reduced when the picture brightness is shifted towards darker values. It is true that the portion of the signal containing the synchronizing pulses is shifted towards the knee of the characteristic curve of the transistor 10 so that a certain amount of distortion is produced. However, since this substantially affects the synchronizing pulses and, as the case may be, the darker picture signals only, which due to the variation of the background brightness of the tube 14 are reproduced with a very small brightness value, the picture quality is not appreciably deteriorated in practice By the use of the circuit arrangement including the resistors 30, 31 and 32 a material reduction of the voltage drop determined by the resistor 12 is obtainable.

What is claimed is:

1. A television circuit comprising an amplifying device having input, common and output electrodes, a source of video signals, means applying said video signals between said input and common electrodes, a source of operating potential having first and second terminals, means connecting said common electrode to said first terminal, voltage stabilizing means and load resistor means connected in that order between said second terminal and said output electrode, said stabilizing means having a voltage drop substantially independent of current flow therethrough, an image display tube having a cathode and a control grid, means connecting said output electrode to said cathode to apply video signals thereto, voltage divider means connected between said first and second terminals, and means connecting said control grid to said voltage divider means, whereby the voltage at said control grid cannot become positive with respect to the voltage at said cathode.

2. A television display tube circuit comprising an amplifying device having input, common and output electrodes, a source of video signals, means applying said video signals between said input and common electrodes, a source of operating potential having first and second terminals, means connecting said common electrode to said first terminal, voltage stabilizing means and load resistor means connected in that order between said second terminal and said output electrode, said stabilizing means having a voltage drop substantially independent of current flow therethrough, an image display tube having a cathode and a control grid, means connecting said output electrode to said cathode to apply said video signals thereto, means connecting said control grid to said source of operating voltage to provide bias voltage for said display tube, and means for varying the voltage between said cathode and control grid whereby the voltage at said control grid cannot become positive with respect to the voltage at said cathode.

3. A television display tube circuit comprising an amplifying device having input, common and output electrodes, a source of video signals, means applying said video signals between said input and common electrodes, a source of operating potential having first and second terminals, means connecting said common electrode to said first terminal, voltage stabilizing means and load resistor means connected in that order between said second terminal and said output electrode, said stabilizing means having a voltage drop substantially independent of current flow therethrough, an image display tube having a cathode and a control grid, a voltage divider connected between said first and second terminals, contrast potentiometer means connected between said output electrode and a tap on said voltage divider, means connecting the arm of said potentiometer to said cathode, means connecting said control grid to said source of operating voltage to provide bias voltage from said display tube, and means for varying the voltage between said cathode and control grid whereby the voltage at said control grid cannot become positive with respect to the voltage at said cathode.

4. A television display tube circuit comprising an amplifying device having input, common and output electrodes, a source of video signals, means applying said video signals between said input and common electrodes, a source of operating potential having first and second terminals, means connecting said common electrode to said first terminal, voltage stabilizing means and load resistor means connected in that order between said second terminal and said output electrode, said stabilizing means having a voltage drop substantially independent of current flow therethrough, an image display tube having a cathode and a control grid, a voltage divider connected between said first terminal and a point of fixed potential, contrast potentiometer means connected between said output electrode and a tap on said voltage divider, means connecting the arm of said contrast potentiometer to said cathode, a brightness potentiometer, means serially connecting said brightness potentiometer and a resistor in that order between said second and first terminals, and means connecting the arm of said brightness potentiometer to said control grid, said brightness potentiometer and last-mentioned resistor having relative values with respect to the voltage drop across said voltage stabilizing means to prevent said control grid from becoming positive with respect to said cathode.

5. The circuit of claim 4, comprising means connected to said output electrode for clipping synchronizing peaks of said video signals.

6. The circuit of claim 4, in which said voltage stabilizing means is a voltage dependent resistor.

7. A television display tube circuit comprising an amplifying device having input, common and output electrodes, a source of video signals, means applying said video signals between said input and common electrodes, a source of operating potential having first and second terminals, means connecting said common electrode to said first terminal, voltage stabilizing means and load resistor means connected in that order between said second terminal and said output electrode, said stabilizing means having a voltage drop substantially independent of current flow therethrough, an image display tube having a cathode and a control grid, a first voltage divider connected between said first terminal and a point of fixed potential, contrast potentiometer means connected between said output electrode and a tap on said first voltage divider, means connecting the arm of said contrast potentiometer means to said cathode, a second voltage divider connected in parallel with said contrast potentiometer means, a brightness potentiometer connected in parallel with said first voltage divider, means connecting the arm of said brightness potentiometer to a tap on said second voltage divider, and means connecting said control grid to said source of operating voltage.

8. The circuit of claim 7, in which said amplifying device is a PNP transistor, wherein said input, common and output electrodes are the base, emitter and collector electrodes respectively of said transistor, and said first and second terminals are the positive and negative terminals respectively of said source of operating potential.

9. A television contrast and brightness control circuit comprising an amplifying device having input, common and output electrodes, a source of video signals, means applying said signals between said input and common electrodes, a source of operating voltage having first and second terminals, means connecting said common electrode to said first terminal, load impedance means, means connecting said load impedance means between said output electrode and said second terminal, a first voltage divider having a first tap, means connecting said first voltage divider between said first and second terminals, contrast potentiometer means connected between said output electrode and said first tap, a display tube having a signal input electrode, means connecting the arm of said contrast potentiometer to said signal input electrode, a second voltage divider having a second tap, means connecting said second voltage divider in parallel with said contrast potentiometer means, brightness potentiometer means, means connecting said brightness potentiometer means in parallel with said first voltage divider, and means connecting the arm of said brightness potentiometer to said second tap.

10. The circuit of claim 9, in which said second tap is located on said second voltage divider in a position whereby the voltage across said contrast potentiometer means is zero when said video signals are at black level.

11. The circuit of claim 10, in which the ratio of resistance of said second voltage divider between said tap and output electrode and the other end thereof is equal to the ratio between the resistances connected between the respective ends of said contrast potentiometer means and said first terminal at black level.

References Cited by the Examiner

UNITED STATES PATENTS

| | | | |
|---|---|---|---|
| 3,027,421 | 3/1962 | Heijligers | 178—7.5 |
| 3,028,509 | 4/1962 | Teltscher et al. | 330—40 |
| 3,051,780 | 8/1962 | Frost | 178—7.5 |

DAVID G. REDINBAUGH, *Primary Examiner.*

J. A. O'BRIEN, *Assistant Examiner.*